(12) United States Patent
Jiang et al.

(10) Patent No.: US 6,598,429 B1
(45) Date of Patent: Jul. 29, 2003

(54) METHOD FOR FABRICATING GRADIENT-INDEX RODS AND ROD ARRAYS

(75) Inventors: Shibin Jiang, Tucson, AZ (US); Philip Lam, Tucson, AZ (US)

(73) Assignee: BeamTek, Inc., Tucson, AZ (US)

( * ) Notice: Subject to any disclaimer, the term of this patent is extended or adjusted under 35 U.S.C. 154(b) by 103 days.

(21) Appl. No.: 09/716,570

(22) Filed: Nov. 17, 2000

(51) Int. Cl.$^7$ .............................................. C03B 23/057
(52) U.S. Cl. ........................ 65/412; 65/30.1; 65/30.13; 65/38; 65/56; 65/37
(58) Field of Search ...................... 65/412, 30.1, 30.13, 65/38, 56, 37

(56) References Cited

U.S. PATENT DOCUMENTS

| | | |
|---|---|---|
| 3,614,197 A | 10/1971 | Nishizawa et al. |
| 3,753,607 A | 8/1973 | Kitano et al. |

(List continued on next page.)

FOREIGN PATENT DOCUMENTS

| | | | |
|---|---|---|---|
| JP | 63-147837 | * | 6/1988 |

OTHER PUBLICATIONS

I. Kitano, H. Ueno and M. Toyama, "Gradient–index lens for low–loss coupling of a laser diode to single–mode fiber," Applied Optics, vol. 25 No. 19 (Oct. 1, 1986) pp. 3336–3339.

(List continued on next page.)

Primary Examiner—John Hoffmann

(74) Attorney, Agent, or Firm—Birdwell, Janke & Durando, PLC

(57) ABSTRACT

A method for fabricating gradient-index rods and rod arrays. A central rod of optical glass having predetermined properties and predetermined outside dimensions is placed inside a tube of optical glass having predetermined properties and predetermined outside dimensions, to form an assembly. The inside dimensions of the tube are substantially equal to the outside dimensions of the rod. The tube is formed of a plurality of coaxial sleeves, the outside dimensions of each interior sleeve being substantially equal to the inside dimensions of the next adjacent sleeve, each sleeve having a selected refractive index so that, together with the tube, the refractive indices from the central rod through the outermost sleeve approximate the refractive index profile of the gradient-index rod to be fabricated. The central rod and sleeve material is selected so that their respective thermal indices of expansion are substantially equal. The central rod and tube assembly is placed in a mold having inside dimensions substantially equal to the outside dimensions of the tube. The mold is oriented vertically so as to ensure that there is no net lateral gravitational force on the assembly. The mold is then heated with the central rod and the tube therein at a predetermined temperature for a predetermined time so as to cause a selected amount of diffusion of material between the central rod and the sleeves and thereby produce a radial refractive index gradient. The temperature is then gradually reduced to anneal the glass. The cooled glass comprises a preform which is then drawn into a gradient-index rod. Gradient-index elements fabricated in accordance with the invention may be placed into a substrate and drawn into elements that have a desired external shape while retaining the optical properties of a radially symmetric, cylindrical gradient-index rod. Arrays of gradient-index rods fabricated using the invention may also be bonded together or imbedded in a substrate.

19 Claims, 13 Drawing Sheets

U.S. PATENT DOCUMENTS

| | | | |
|---|---|---|---|
| 3,801,181 A | | 4/1974 | Kitano et al. |
| 3,830,640 A | | 8/1974 | Kitano et al. |
| 3,859,103 A | | 1/1975 | Yoshiyagawa et al. |
| 3,941,474 A | | 3/1976 | Kitano et al. |
| 3,963,468 A | * | 6/1976 | Jaeger et al. .................. 65/386 |
| 4,022,855 A | | 5/1977 | Hamblen |
| 4,025,156 A | | 5/1977 | Gloge et al. |
| 4,784,679 A | | 11/1988 | Lentz |
| 4,883,522 A | | 11/1989 | Hagerty et al. |
| 4,907,864 A | | 3/1990 | Hagerty et al. |
| 4,929,065 A | | 5/1990 | Hagerty et al. |
| 5,055,120 A | | 10/1991 | Tran et al. |
| 5,200,858 A | | 4/1993 | Hagerty et al. |
| 5,236,486 A | | 8/1993 | Blankenbecler et al. |
| 5,262,896 A | | 11/1993 | Blankenbecler |
| H1259 H | | 12/1993 | Aggarwal et al. |
| 5,522,003 A | | 5/1996 | Ward et al. |
| 5,629,800 A | | 5/1997 | Hamblen |
| 5,630,857 A | | 5/1997 | Xu et al. |
| 5,656,056 A | | 8/1997 | Braglia et al. |
| 5,673,353 A | | 9/1997 | Ward et al. |
| 5,689,374 A | | 11/1997 | Xu et al. |
| 5,702,497 A | * | 12/1997 | Oh et al. ....................... 65/412 |
| 5,735,927 A | * | 4/1998 | Sanghera et al. ............. 65/389 |
| 5,776,222 A | | 7/1998 | Kopylov et al. |
| 5,785,729 A | | 7/1998 | Yokokawa et al. |
| H1754 H | | 10/1998 | Tran et al. |
| 5,881,195 A | | 3/1999 | Walker |
| 5,912,397 A | | 6/1999 | Baik et al. |
| 5,922,099 A | | 7/1999 | Yoon et al. |
| 5,938,805 A | | 8/1999 | Baik et al. |
| 6,062,047 A | | 5/2000 | Fredholm et al. |
| 6,088,166 A | | 7/2000 | Lee |
| 6,128,926 A | | 10/2000 | Senapati et al. |
| 6,189,339 B1 | * | 2/2001 | Hiraiwa ....................... 65/17.3 |

OTHER PUBLICATIONS

A. L. Mikaelian, "Self–focusing media with variable index of refraction," rep. from Progress in Optics, vol. 17 (1980) pp. 281–345.

Terrence Towe and Simin Cai, "OEM Optical Components: Gradient–index lenses make light work of beam directing," Laser Focus World, vol. 35, No. 10 (Oct. 1999).

H. Kita, I. Kitano, T. Uchida and M. Furukawa, "Light–focusing glass fibers and rods," Journal of The American Ceramic Society, vol. 54, No. 7 (Jul. 1971) pp. 321–326.

S. Houde–Walter, "Recent progress in gradient–index optics," SPIE, vol. 935 (1988) pp. 2–26.

M. Yamane, J. B. Caldwell and D. T. Moore, "Preparation of gradient–index glass rods by the sol–gel process," Journal of Non–Crystalline Solids, vol. 85 (1986) pp. 244–246.

K. Shingyouchi, S. Konishi, K. Susa and I. Matsuyama, "Radial gradient refractive–index glass rods prepared by a sol–gel method," Electronics Letters vol. 22 No. 2 (Jan. 16, 1986) pp. 99–100.

J. H. Simmons, R. K. Mohr, D. C. Tran, P. B. Macedo and T. A. Litovitz, "Optical properties of waveguides made by a porous glass process," Applied Optics, vol. 18 No. 16 (Aug. 15, 1979) 2732–2733.

M. A. Pickering, R. L. Taylor and D. T. Moore, "Gradient infrared optical material prepared by a chemical vapor deposition process," rep. from Applied Optics, vol. 25 No. 19 (Oct. 1, 1986) pp. 3364–3372.

P. Sinai, "Correction of optical aberrations by neutron irradiation," Applied Optics, vol. 10 No. 1 (Jan. 1971) 99–104.

S. N. Houde–Walter and D. T. Moore, "Delta–n control in GRIN glass by additives in AgCl diffusion baths," rep. from Applied Optics, vol. 25 No. 19 (Oct. 1, 1986) 3373–3378.

R. H. Doremus, "Optical properties of small silver particles," Journal of Chemical Physics, vol. 42, No. 1 (Jan. 1, 1965) 414–417.

S. Ohmi, H. Sakai, Y. Asahara, S. Nakayama, Y. Yoneda and T. Izumitani, "Gradient–index rod lens made by a double ion–exchange process," rep. from Applied Optics, vol. 27 No. 3 (Feb. 1, 1988) 496–499.

D. T. Moore, "Design of singlets with continuously varying indices of refraction," rep. from Journal of the Optical Society of America, vol. 61 No. 7 (Jul. 1971) pp. 886–894.

M. V. R. K. Murty, "Laminated lens," rep. from Journal of the Optical Society of America, vol. 46 No. 7 (Nov. 1956) pp. 998–999.

* cited by examiner

METHOD FOR FABRICATING GRADIENT-INDEX RODS AND ROD ARRAYS

U.S. GOVERNMENT RIGHTS

This invention was made with federal government support under contract No. DASG 60-00-M-0100 awarded by the Ballistic Missile Defense Organization. The government has certain rights in the invention.

FIELD OF THE INVENTION

This invention relates to methods for fabricating gradient-index rods and rod arrays, particularly gradient-index glass lenses with a radial index profile.

BACKGROUND OF THE INVENTION

The radial gradient refractive index ("GRIN") glass rod is one of the fundamental optical communication system components. It is widely employed, for example, as an optical beam collimator in optical communication devices to couple signals and pump diode lasers into single mode optic fiber, to convert a diverging beam from a fiber into a collimated beam, and to refocus a collimated optical beam into an optical fiber. I. Kitano, H. Ueno, M. Toyama, "Gradient-index lens for low-loss coupling of a laser diode to single-mode fiber," Applied Optics, Vol. 25(19), pp.3336, 1986. Most fiber optic devices, from isolators to n×n switches and dense wavelength division multiplexing devices, depend on a collimated optical beam to achieve minimum insertion loss and maximum efficiency. T. Towe, S. Cai, "OEM optical components: Gradient-index lenses make light work for beam directing," Laser Focus World, Vol. 35, No. 10, 1999. Most necessary processing for the optical signals are carried out in the physical space between the collimators.

Many techniques have been investigated to fabricate radial GRIN materials including ion-exchange, I. Kitano, K. Koizume, H. Matsumura, T. Uchida, M. Furukawa, "A light-focusing fiber guide prepared by ion-exchanged techniques," J. of Japan Society of Applied Physics, Vol. 39, pp.63, 1970, H. Kita, I. Kitano, T. Uchida, M. Furukawa, "Light-focusing glass fibers and rods," J. Am. Ceram. Soc., Vol. 54, pp.321, 1971, S. Houde-Walter, "Recent progress in gradient-index optics," SPIE Vol. 935, 1988; sol-gel, M. Yamane, J. B. Caldwell, D. T. Moore, "Preparation of gradient-index glass rods by the Sol-Gel process," J. Non-Cryst. Sol., V.85, pp.244 (1986), K. Shingyouchi, S. Konishi, K. Susa, I. Matsuyama, "Radial gradient refractive index glass rods prepared by a sol-gel method," Elec. Lett., V.22 pp.99, (1986); molecular stuffing, J. H. Simmons, R. K. Mohr, D. C. Tran, P. B. Macedo and J. A. Litovitz, "Optical properties of waveguide made by a porous glass process," Applied Optics, 18, pp.2732, (1979); diffusion in plastics, D. Hamblen, Kodak and U.S. Pat. No. 4,022,855; chemical vapor deposition, M. A. Pickering, R. L. Taylor, and D. T. Moore, "Gradient infrared optical material prepared by a chemical vapor deposition process," Appl. Optics, 25, pp.3364, 1986; photochemical, N. F. Borrelli and D. L. Morse, "Planar gradient-index structures," in Technical Digest, Topical Meetings on Gradient-index Optical Imaging Systems, Kobe, Japan, D1, 1983; as well as neutron irradiation, P. Sinai, Applied Optics, 10, 99, 1971. Commercial radial GRIN rods are mostly fabricated by ion-exchange and sol-gel.

Ion-exchanged cesium or thallium glasses have been widely used for fabricating radial GRIN rods. Cesium (Cs$^+$) or thallium (Tl$^+$) glasses have many advantages, including excellent optical transparency, but they suffer from many serious drawbacks. The first is the very high toxicity of Cs$^+$ or Tl$^+$ ions in the mother glass rod. This is particularly dangerous in the glass melting stage where the temperature is high and the vapor pressures are high. The second is that the selection of the refractive index of the mother glasses is restricted. The refractive indices of the mother glasses are high. A high refractive index will produce a high back reflection. The third is the slow ionic diffusion process. Typically, the glass rod has to be dipped in the molten salt at a temperature around 500° C. for several hundred hours. The maximum diameter of the radial GRIN rod is limited to 3 mm due to the low ionic diffusion process.

The silver ion is sometimes used as an alternative to the thallium ion because it has a higher mobility, S. Houde-Walter, D. T. Moore, "Delta-n control on GRIN glass by additives in AgCl diffusion baths," Applied Optics, Vol. 25(19), pp.3373, 1986. However, it is difficult to fabricate silver glasses because the silver tends to precipitate out of the glass or form a fine metallic colloid in the glass, R. H. Doremus, "Optical properties of small silver particles," J. Chem. Phys., V.41, pp.414, 1965. A technique called "ion-stuffing" avoids the difficulty of making silver glass from a batch melt, S. Ohmi, et al, "Gradient-index lenses made by double ion exchange process," Appl. Opt., V. 27, pp.496, 1988. The technique uses a sodium containing glass and exchanges the sodium for silver in a silver nitrate molten salt. The second step is to immerse the glass rod in a sodium nitrate molten salt and exchange some of the silver ions out near the surface of the glass. So the glass rod has a higher silver concentration at the center than the surface. The major problem for radial GRIN rods fabricated by this process is the photostability. The glass will be colored due to the metal colloid.

The sol-gel method involves the synthesis of a multi-components alkoxide gel, which is shaped by a mold. Since the gel is porous, dopants can be removed or introduced rapidly by immersing the gel in acids for leaching or in a solution containing dopants for introducing. After the diffusion, the gel is dried and sintered to yield a GRIN glass. The sol-gel method has two major advantages over the ion-exchange technique. The first is the rapid transport process. Since the diffusion of leaching is conducted in a porous gel, the transport process is much more rapid than the ionic diffusion process in ion-exchange technique. It means that a larger diameter radial GRIN rod can be fabricated. The second is that a variety of ions can migrate through the gel pores. Bivalent ions can be easily transported through the gel pores. Here, major drawbacks for sol-gel method are that it is difficult to control the index profile and fracture during sintering. Since ions will continue to migrate during the drying and sintering processes, the index profile is difficult to control. During the drying and sintering processes, the outside part consolidates more quickly than the insider part. Thus, gaseous by-products can be trapped in the middle of the material. The thermal expansion coefficient of the inside part will then be higher than the outside part, which causes fracture during sintering process.

There is another type of GRIN material, the axial GRIN material, in which the refractive index varies along optical axis, D. T. Moore, "Design of singlets with continuously varying indices of refraction," Journal of the Optical Society of America, Vol. 46(7), pp.998, 1971. In one known technique for fabricating axial GRIN glass, disclosed in U.S. Pat. Nos. 5,630,857 and 5,689,374, glasses having different refractive indices are stacked together. These glasses are then thermally diffused at a high temperature to form a monolithic glass blank with a smooth refractive index profile. However, the end surfaces of an axial GRIN must be individually polished to spherical shape in order to focus the optical beam, M. Murty, "Laminated lens," Journal of the Optical Society of America, Vol. 61(7), pp. 886, 1971, which limits their application. By comparison, radial GRIN material has inherent focusing power since the refractive index varies perpendicularly to optical axis. The end surfaces of radial GRIN rods are flat, which simplifies the fabrication process and increases the compatibility significantly.

Therefore, there is a need for an improved method for forming GRIN optical elements that is safe and efficient, produces clear glass, and produces radial GRIN rods directly.

SUMMARY OF THE INVENTION

The present invention solves the aforementioned problems and meets the aforementioned need by providing a novel method of fabricating a GRIN optical element. In accordance with the invention, a central rod of optical glass having predetermined properties and predetermined outside dimensions is placed inside a tube of optical glass having predetermined properties and predetermined outside dimensions, to form an assembly. The inside dimensions of the tube are substantially equal to the outside dimensions of the rod. The tube is formed of a plurality of coaxial sleeves, the outside dimensions of each interior sleeve being substantially equal to the inside dimensions of the next adjacent sleeve, each sleeve having a selected refractive index so that, together with the central rod, the refractive indices from the central rod through the outermost sleeve approximate the refractive index profile of the GRIN element to be fabricated. The central rod and sleeve material are selected so that their respective thermal indices of expansion are substantially equal.

The rod and tube assembly is placed in a mold having inside dimensions substantially equal to the outside dimensions of the tube. The mold is oriented vertically so as to ensure that there is no net lateral gravitational force on the assembly. The mold is then heated with the assembly therein at a predetermined temperature for a predetermined time so as to cause a selected amount of diffusion of material between the central rod and the sleeves and thereby produce a radial refractive index gradient. The temperature is then gradually reduced to anneal the glass. The cooled glass comprises a preform which is then drawn into an elongate, continuous GRIN rod. The continuous GRIN rod is then cut into discrete GRIN rod elements.

GRIN elements fabricated in accordance with the invention may be placed into a glass substrate and drawn into elements that have a desired external shape while retaining the optical properties of a radially symmetric, cylindrical GRIN rod. Arrays of GRIN preforms fabricated using the invention may also be bonded together or imbedded in a substrate, and thereafter drawn to produce GRIN arrays.

Accordingly, it is a principal object of the present invention to provide a novel and improved method for fabricating radial GRIN optical elements.

It is another object of the present invention to provide a method for fabricating radial GRIN optical elements with high fabrication productivity.

It is a further object of the present invention to provide a method for fabricating radial GRIN optical elements with high reproducibility.

It is yet another object of the present invention to provide a method for fabricating radial GRIN optical elements that is flexible in producing elements with various index profiles.

It is yet a further object of the invention to provide a method for fabricating radial GRIN optical elements having a desired outside shape while retaining the optical properties of a radially symmetric, cylindrical gradient-index element.

It is an additional object of the present invention to provide a method for fabricating radial GRIN optical element arrays.

The foregoing and other objects, features, and advantages of the invention will be more readily understood upon consideration of the following detailed description of the invention, taken in conjunction with the accompanying drawings.

BRIEF DESCRIPTION OF THE DRAWINGS

FIG. 2 is a side view of an exemplary gradient-index rod used as a collimator, showing light rays coupled from a single mode optical fiber there through.

DETAILED DESCRIPTION OF THE INVENTION

A GRIN rod typically is cylindrical with a circular cross section and has a radial refractive index profile like that shown in FIG. 1, described mathematically as follows:

$$N(r)=N_0+Ar^2+Br^4+Cr^6+Dr^8+\ldots$$

where r is the radial distance from the center of the rod;

$|r_0|$ is the maximum radius of the rod;

N(r) is the refractive index as a function of the radial distance from the center of the rod;

$N_0$ is the refractive index at the center of the rod; and

A, B, C and D are constants.

Typically, the rod material is glass, $N_0=1.65$, $A=-2.22\times10^{-2}$, $B=2.40\times10^{-4}$, and the higher order terms in r are insignificant; however, it is to be recognized that these values are dependent on the actual materials used to fabricate the rod, and that the choice of materials and concomitant values is primarily a matter of design choice.

Figure 2:
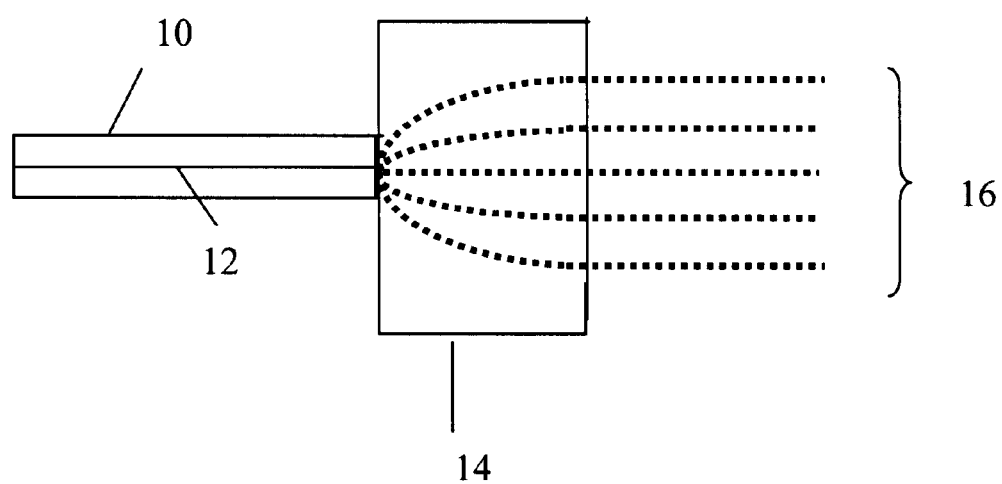
Figure 3:
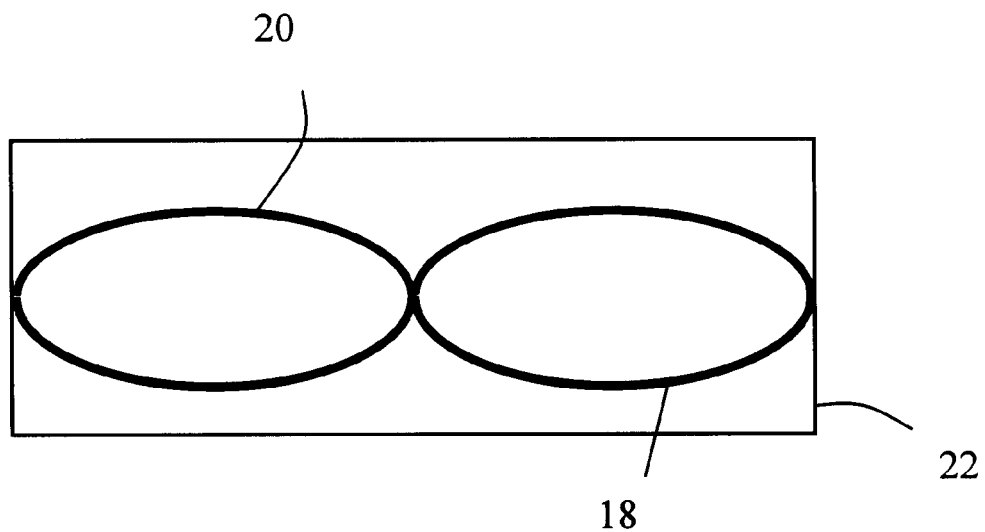
FIG. 3 is a side view of an exemplary gradient-index rod showing ray trajectories therein.

A GRIN rod can be used like a lens whose refractive index, rather than the lens thickness, varies to vary the optical path length spatially in a plane perpendicular to the optical axis of light propagating through the lens. In such applications the most common GRIN rod has a radially varying profile, as shown in FIG. 1, so that the rod behaves like an axially symmetric convex-convex lens. Such a GRIN rod may be used, for example, as a collimator, as shown in FIG. 2. In that example, a narrow input light beam 10 emitted from the end of an optical fiber 12 abutted adjacent one end of a GRIN rod 14 is expanded and collimated into output light beam 16, the length of the rod being equal to the effective focal length of the lens formed thereby. Where the length of the rod is longer than its effective focal length, a light beam will propagate through the GRIN rod like propagation through a series of relay lenses or an optical fiber, as shown by FIG. 3, showing light rays 18, 20 inside a GRIN rod 22. Since the refractive index decreases along the radius as an inverse hyperbolic cosine function in the GRIN rod, the rays radiated from axial point sources are periodically focused on the axis.

Figure 1:
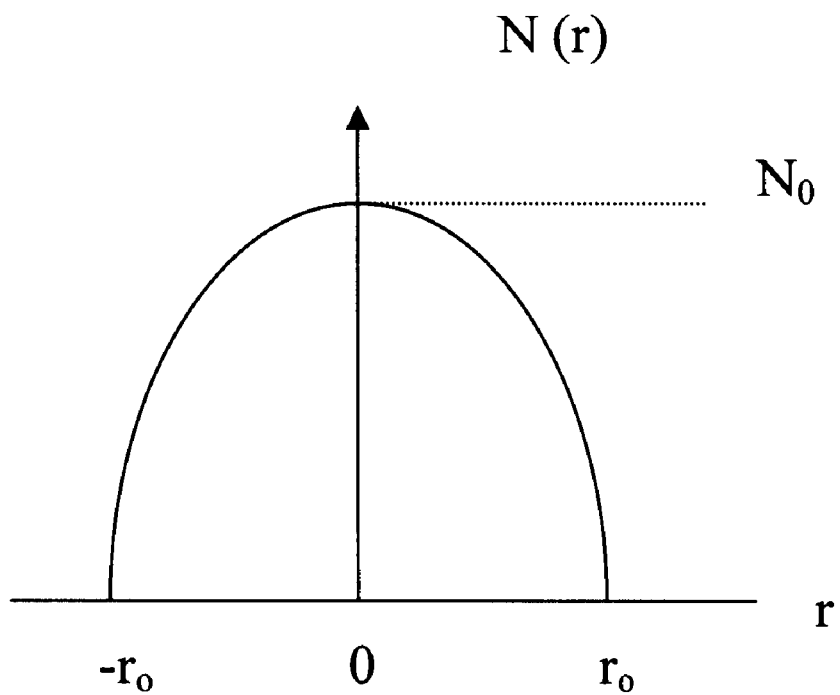
FIG. 1 is a graph of a typical refractive index profile for a gradient-index rod commonly used in optical communications systems.

While the preferred application of the method of the present invention is to fabricate a cylindrical GRIN rod having a circular cross section and a radial refractive index profile as shown in FIG. 1, it is to be recognized that the method of the invention can be used to fabricate a GRIN rod whose cross section is not necessarily circular and whose refractive index profile is not necessarily parabolic.

Figure 4:
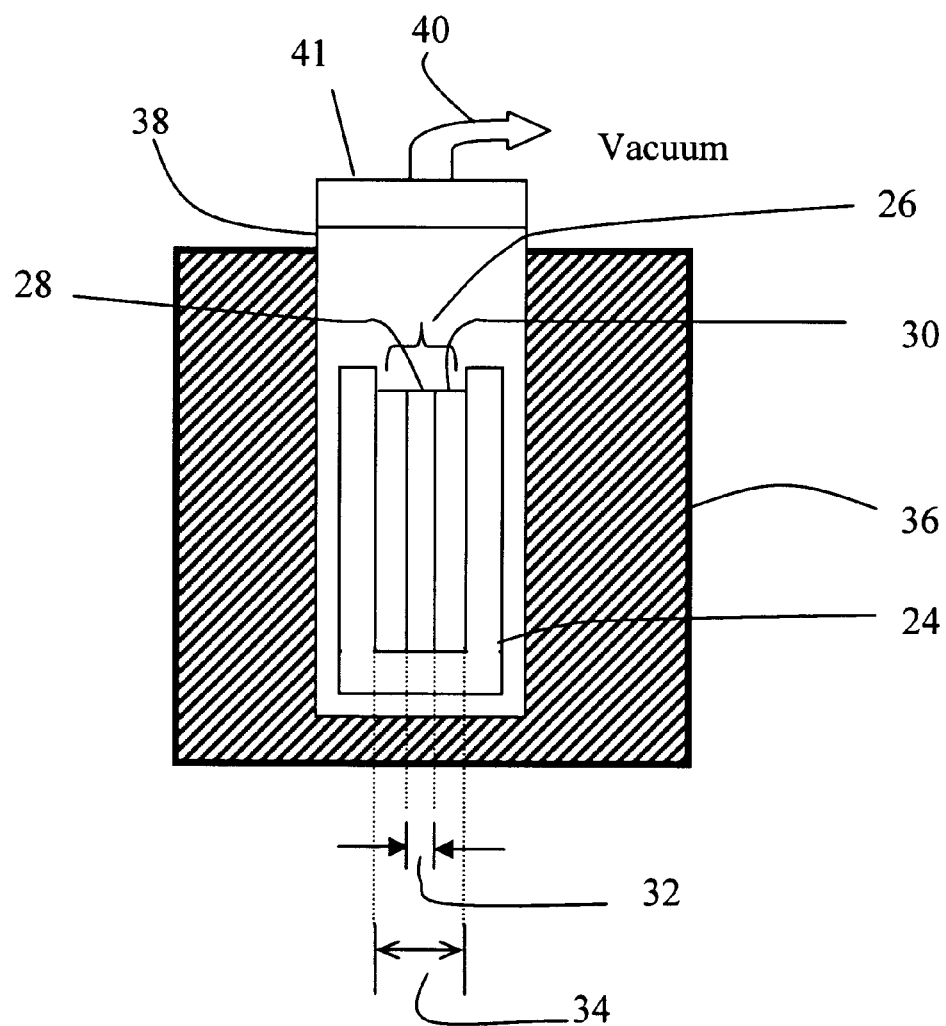
FIG. 4 is side section of assembly for fabricating a gradient-index rod according to the present invention, showing a mold for forming the rod and the base rod material disposed therein.

Turning to FIG. 4, the method according to the present invention, in most basic form, comprises arranging in a mold 24 an assembly 26 of a glass rod 28 disposed in a glass tube 30 and heating the assembly to cause a selected amount of diffusion of material between the rod and the tube and to fuse them together. The outside dimensions 32 of the rod 28 are substantially equal to the inside dimensions of the tube 30, so that the rod fits snugly inside the center of the tube, and the outside dimensions of the tube 34 are substantially equal to the inside dimensions of the mold 24 so that the tube fits snugly inside the center of the mold. Central rods and tubes can be fabricated by known grinding and polishing techniques, thermal extrusion techniques, and the like.

While the rod and tube are preferably cylindrical with respective circular cross sections, so that their inside and outside dimensions are diameters, it is to be understood that other cross sectional shapes may be used in the invention so that there is more than one inside or outside dimension. The rod 28 and tube 30 have different refractive indices so that diffusion of material between them produces a refractive index gradient between them.

The mold 24 is placed in an oven 36 for heating and must, therefore, be a refractory material, such as a ceramic or graphite, that does not deform, diffuse into or stick to the glass of the tube 30. A ceramic or graphite mold can hold high viscosity liquid glasses up to as much as 1100° C. Ordinarily, the mold is oriented vertically so that there is no net lateral gravitational force acting on the assembly 26. This arrangement ensures that, while the rod and tube are heated, the mold maintains the shape of the assembly, and without any net lateral gravitational force the radial diffusion of the material in the assembly is axially symmetric.

It is preferred that the heating of the assembly take place in a vacuum, or at least in a closed container 38, to avoid contamination of the resultant product by diffusion of airborne contaminants into the glass during heating. The container, like the mold, must be a refractory material, such as quartz, for example, so that it is not deformed and does not add contaminants during the heating. If the process is to take place in a vacuum, the container must include an outlet 40 for pulling the vacuum using a conventional pump as is commonly understood in the art. If not, the container should at least include a cover 41 for keeping contaminants out of the container during the heating process. It is to be understood, however, that the method of the invention may be carried out with the glass assembly exposed to air. The container is placed in the oven, which may be any standard oven suitable for glass fabrication.

Once the assembly has been heated for a period of time determined to complete the desired degree of diffusion, it is allowed to cool. Preferably, the temperature of the oven is steadily decreased so that the glass goes through the annealing process as it cools down, as is commonly understood in the art. Alternatively, the mold may be removed from the oven and allowed to cool more rapidly, in which case a separate annealing step must be performed to remove the stresses in the glass. In either case, as the glass is cooled it forms a fused preform having a radial refractive index gradient. Gradient-index glass rods may then be formed from the preform. Once the glass has cooled, the mold may be removed from the preform by breaking the preform and discarding it. This is practical because a ceramic or graphite mold is more brittle than the preform, and the preform produces many discrete GRIN rod elements whose economic value justifies discarding the mold.

Figure 5:
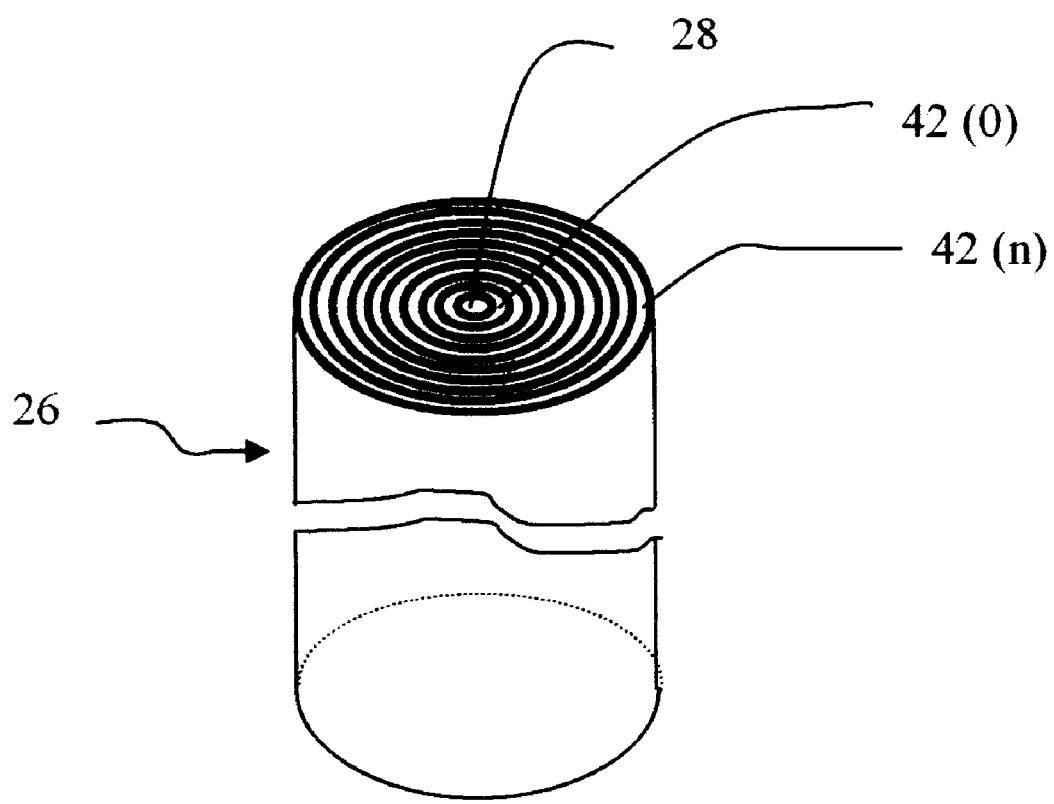
FIG. 5(a) is a perspective view of an assembly of glass elements comprising the base material from which a gradient-index rod is fabricated according to the present invention.
FIG. 5(b) is a graph of an exemplary refractive index profile across a section of an assembly of glass elements comprising the base material from which a gradient-index rod is fabricated according to the present invention.
Figure 5:
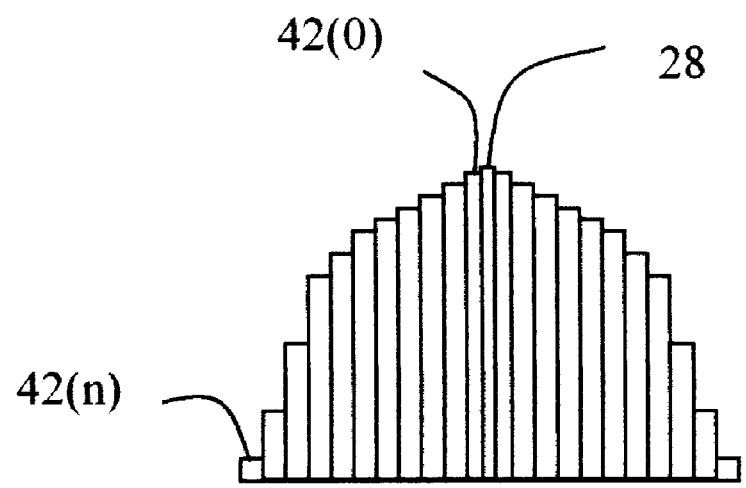
Figure 6:
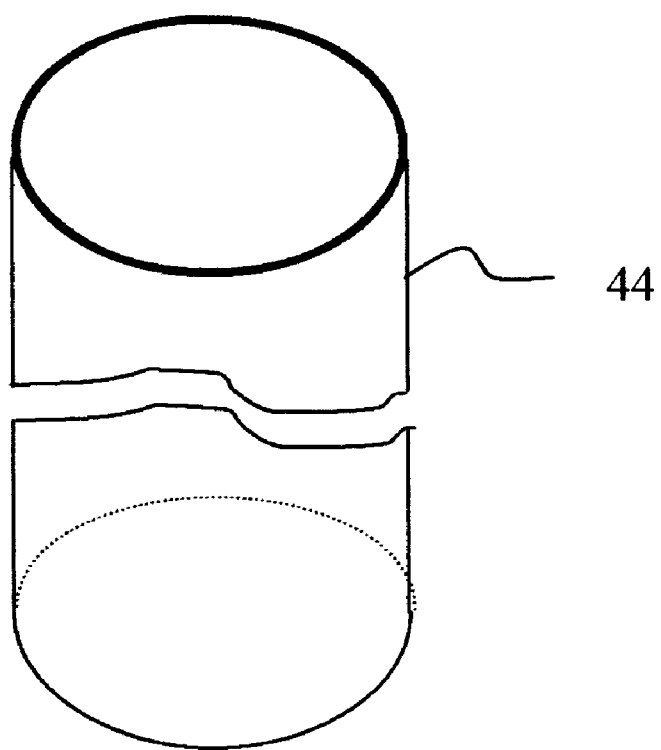
FIG. 6(a) is a perspective view of a thermally diffused gradient-index preform fabricated from the assembly of FIG. 5(a) in accordance with the present invention.
FIG. 6(b) is a graph of the refractive index profile across a section of gradient-index rod fabricated from the assembly of FIG. 5(a) according to the present invention.
Figure 6:
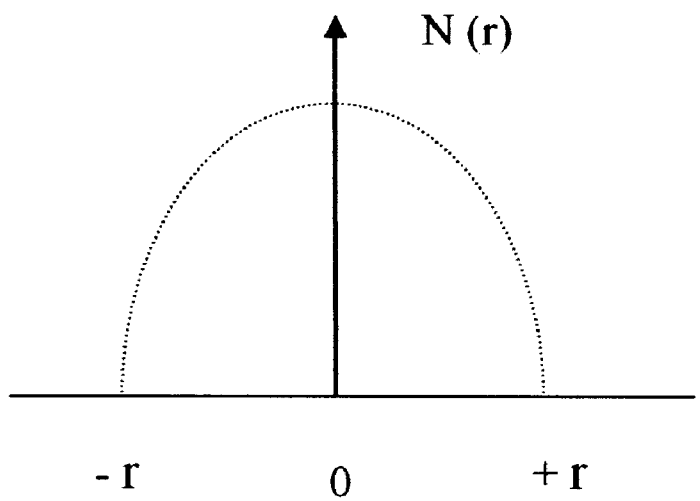

Returning to the assembly 26, the tube 30 would ordinarily comprise a plurality of coaxial sleeves of glass 42(0) . . . (n), as shown in FIG. 5(a), having respectively different refractive indices, as shown in FIG. 5(b). The outside dimensions of each interior sleeve are substantially equal to the inside dimensions of the next adjacent sleeve, each sleeve having a selected refractive index. By choosing the glass for the individual sleeves so that their respective refractive indices approximate in stepped fashion, an essentially continuous radial index gradient of the shape desired may be achieved by diffusion during the heating process. If the individual indices of the rod 28 and sleeves 42(0) . . . 42(n) are as shown in FIG. 5(b), the preform 44 shown in FIG. 6(a) will have a refractive index profile as shown in FIG. 6(b). More specifically, for example, if the index gradient desired is the same as that shown in FIG. 1, the individual indices of the rod 28 and sleeves 42(0) . . . 42(n) should approximate the curve of FIG. 1.

To ensure that the refractive index gradient of the GRIN rod does not vary with temperature, and to prevent the gradient-index rod product from failing under high temperature, the glass of the rod 28 and the glasses of the sleeves should be chosen so as to have substantially equal thermal indices of expansion. While the indices of thermal expansion cannot ordinarily be made identical, they may be matched sufficiently to meet realistic temperature variation and failure specifications, which is what is meant herein by "substantially equal."

Figure 7:
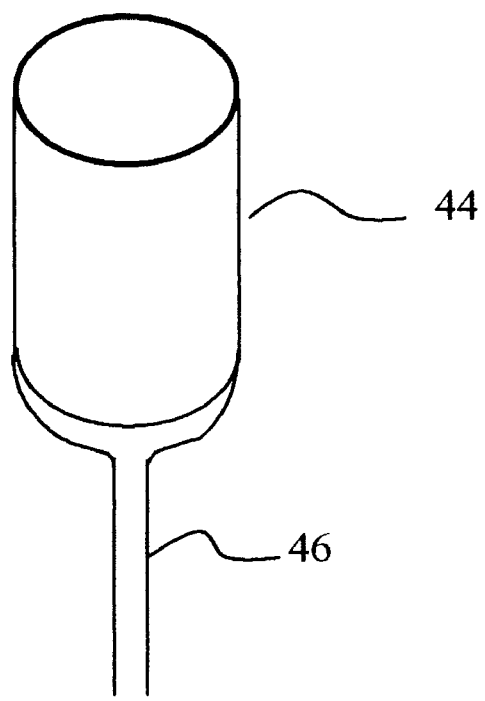
FIG. 7 is a perspective view of the preform of FIG. 6(b) being drawn into a gradient-index rod.

Turning to FIG. 7, the preform 44 is drawn into an elongate, continuous GRIN rod 46 by standard drawing procedures commonly known in the art. This can be carried out using commercially available draw towers such as, for example, those available form Advantek Engineering of Sturbridge, Mass. The continuous rod 46 is then cut into individual rods of desired length, as shown in FIGS. 2 and 3, for example.

By way of example of the basis process, a simple GRIN rod can be produced from the three different types of optical glasses available from Schott, a well known optical glass manufacturer. The glasses are formed as cylinders polished to the dimensions set forth below:

| Part | Glass | Inside diameter | Outside diameter |
| --- | --- | --- | --- |
| Central rod | SSKN5 | not applicable | 10 millimeters |
| First sleeve | SK15 | 10 millimeters | 18 millimeters |
| Second sleeve | SK2 | 18 millimeters | 26 millimeters |

All of the parts are 6.35 cm in length. They are assembled concentrically in a ceramic mold whose temperature is raised to 835° C. and held at that temperature for 3 hours. Then the temperature is decreased at 5 degrees per hour to the diffusion temperature of 775° C. and held at that temperature for 120 hours. Then the temperature is steadily decreased to room temperature so as to cause annealing. The resultant preform may then be drawn into a GRIN rod having a diameter, for example, of 4.5 millimeters.

Figure 8:
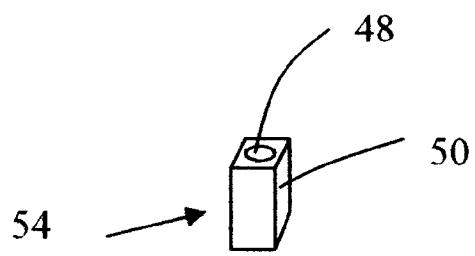
FIG. 8(a) is a perspective view of a gradient-index rod disposed within a rectangular prismatic substrate in accordance with the present invention.
FIG. 8(b) is a perspective view of a gradient-index preform disposed within a rectangular prismatic substrate preform in accordance with the present invention.
Figure 8:
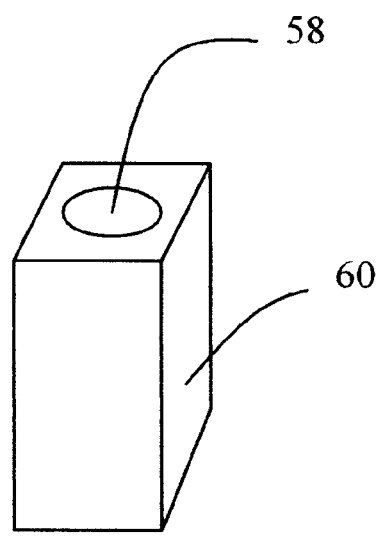
Figure 9:
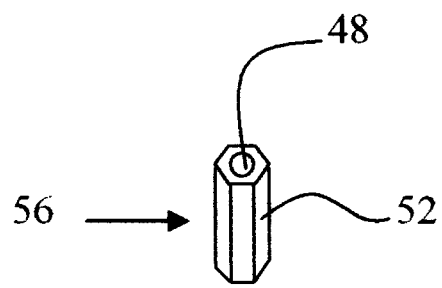
FIG. 9(a) is a perspective view of a gradient-index rod disposed within a hexagonal prismatic substrate in accordance with the present invention.
FIG. 9(b) is a perspective view of a gradient-index preform disposed within a hexagonal prismatic substrate preform in accordance with the present invention.
Figure 9:
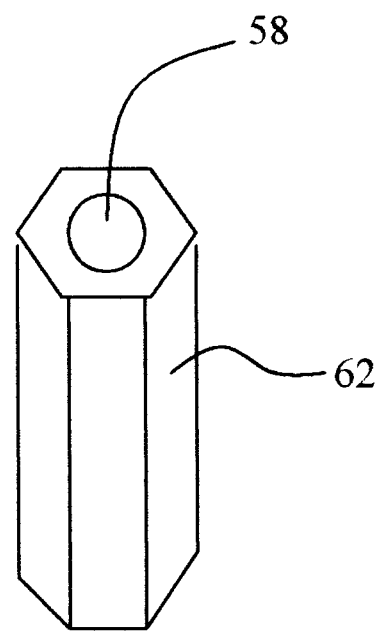

In addition to the well known cylindrical radial GRIN rod shown by FIGS. 2 and 3, the method of the invention may be used to fabricate novel gradient-index structures wherein a radial GRIN rod 48 is enclosed by a glass substrate 50 or 52, as shown in FIGS. 8(a) and 9(a). This produces a gradient-index element having a desired outside shape, such as the square 54 and hexagonal 56 shapes shown in FIGS. 8(a) and 9(a), respectively, while maintaining the cylindrical shape of the rod itself, and the concomitant optical properties of the radially symmetric, cylindrical GRIN rod. A gradient-index preform 58 is fabricated as described above and inserted into a substrate preform such as 60 or 62. The GRIN rod and substrate are then drawn together to produce the elements of desired outer shape, such as elements 54 and 56.

Figure 10:
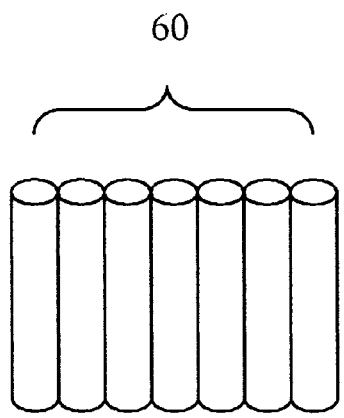
FIG. 10(a) is a perspective view of an array of gradient-index rod preforms fabricated in accordance with the present invention and bonded together.
FIG. 10(b) is a perspective view of an array of gradient-index rods fabricated in accordance with the present invention.
Figure 10:
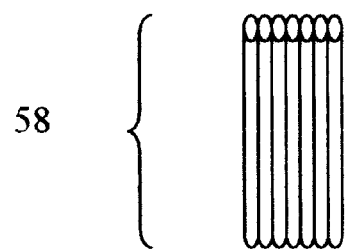
Figure 11:
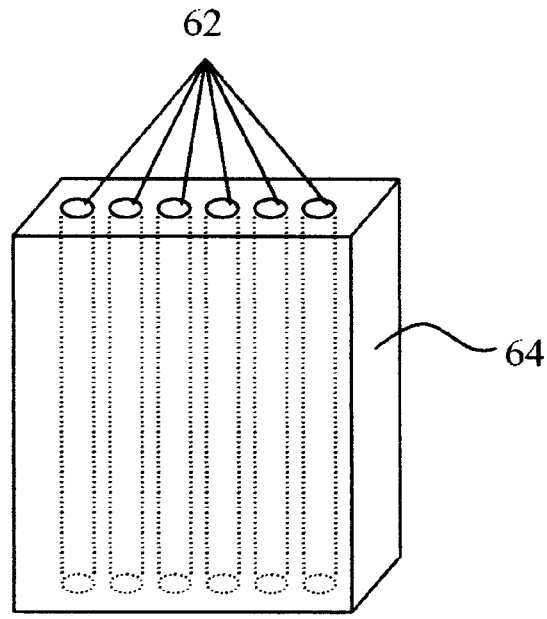
FIG. 11(a) is a perspective view of an array of gradient-index rod preform disposed within a rectangular prismatic substrate preform, fabricated in accordance with the present invention.
FIG. 11(b) is a perspective view of an array of gradient-index rods disposed within a rectangular prismatic substrate, fabricated in accordance with the present invention.
Figure 11:
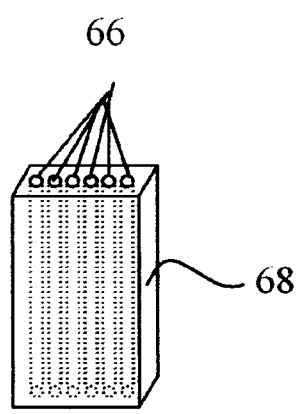

Arrays of GRIN rods may also be formed from a plurality of GRIN rods fabricated as described above. Referring to FIGS. 10(a) and 10(b), in one embodiment an array 58 is formed from a plurality of gradient-index preforms 60 bonded together with cement or thermal bonding, as is commonly understood in the art, then drawn together to form the array. In a preferred embodiment, an array of gradient-index preforms 62 is embedded in a substrate preform 64, which is then drawn to produce an optical element comprising an array of GRIN rods 66 in a substrate 68, as shown in FIGS. 11(a) and 11(b).

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method of fabricating a gradient-index element, comprising:

providing a central rod of optical material having predetermined properties and predetermined outside dimensions;

providing a tube of optical material having predetermined properties, inside dimensions substantially equal to said outside dimensions of said central rod, and predetermined outside dimensions, providing a mold with inside dimensions substantially equal to said outside dimensions of said tube;

placing said central rod inside said tube, and said tube inside said mold; and heating said mold with said central rod and said tube therein at a predetermined temperature for a predetermined time so as to cause a selected amount of diffusion of material between said central rod and said tube.

2. The method of claim 1, wherein, during said heating step, said mold is oriented so as to minimize the lateral force of gravity on said central rod and tube.

3. The method of claim 1, wherein said central rod is selected to have a first refractive index and said tube is selected to have a second refractive index different from said first refractive index so that said diffusion of material between said central rod and said tube produces a refractive index gradient there between.

4. The method of claim 3, further comprising selecting said central rod and tube so that their respective thermal indices of expansion are substantially equal.

5. The method of claim 1, further comprising, after said heating step, cooling said central rod and tube so as to produce a preform having a refractive index gradient from the center to the outside thereof.

6. The method of claim 1, further comprising constructing said tube from a plurality of coaxial sleeves, the outside dimensions of each interior sleeve being substantially equal to the inside dimensions of the next adjacent sleeve, each said sleeve having a selected refractive index.

7. The method of claim 6, further comprising selecting said central rod and said sleeves so that their respective refractive indices correspond to a desired refractive index profile from the center of said central rod through the outermost said sleeve.

8. The method of claim 7, wherein said refractive indices are selected so that the refractive index decreases from the center of the said central rod through the outermost sleeve.

9. The method of claim 8, further comprising providing said central rod and said sleeves with substantially circular cross sections.

10. The method of claim 6, wherein said refractive indices are selected so that, after said heating step, the refractive index varies from the center of said central rod through the outermost sleeve substantially in accordance with the following formula:

$$N(r) = N_0 + Ar^2 + Br^4,$$

where
- r is the radial distance from the center of said central rod;
- N(r) is the refractive index as a function of the radial distance from the center of said rod;
- $N_0$ is the refractive index at the center of said central rod; and
- A and B are constants.

11. The method of claim 6, further comprising selecting said rod and sleeves so that their respective thermal indices of expansion are substantially equal.

12. The method of claim 6, further comprising, after said heating step, cooling said central rod and tube so as to fuse said central rod and tube together as a preform having a refractive index gradient from the center to the outside thereof.

13. The method of claim 12, further comprising, after said cooling step, breaking said mold to remove said preform therefrom.

14. The method of claim 13, further comprising providing a substrate having a selected outside and an aperture there through whose inside dimensions are substantially equal to the outside dimensions of said preform, inserting said preform in said substrate, and drawing said preform and substrate together to produce a radial gradient-index rod having said selected outside shape.

15. The method of claim 13, further comprising producing a plurality of said preforms, bonding said preforms together laterally to form a preform array, and drawing said preform array to produce an array of gradient-index rods.

16. The method of claim 13, further comprising producing a plurality of said preforms, providing a substrate having a selected outside shape and an array of aperture there through whose inside dimensions are substantially equal to the outside dimensions of said preforms, inserting said preforms in respective apertures in said substrate, and drawing said preforms and substrate together to produce an array of radial gradient-index rod having said selected outside shape.

17. The method of claim 12, further comprising, during said cooling step, steadily reducing the temperature of the mold so as to anneal said preform.

18. The method of claim 17, further comprising drawing said preform into a gradient-index rod of cross sectional area perpendicular to the direction of draw less than the cross sectional area of said preform.

19. The method of claim 18, further comprising axially separating said gradient-index rod into a plurality of separate gradient-index optical elements.

\* \* \* \* \*